C. W. BENJAMIN.
STEPLESS CAR.
APPLICATION FILED APR. 4, 1913.
1,186,539.
Patented June 13, 1916.
5 SHEETS—SHEET 5.
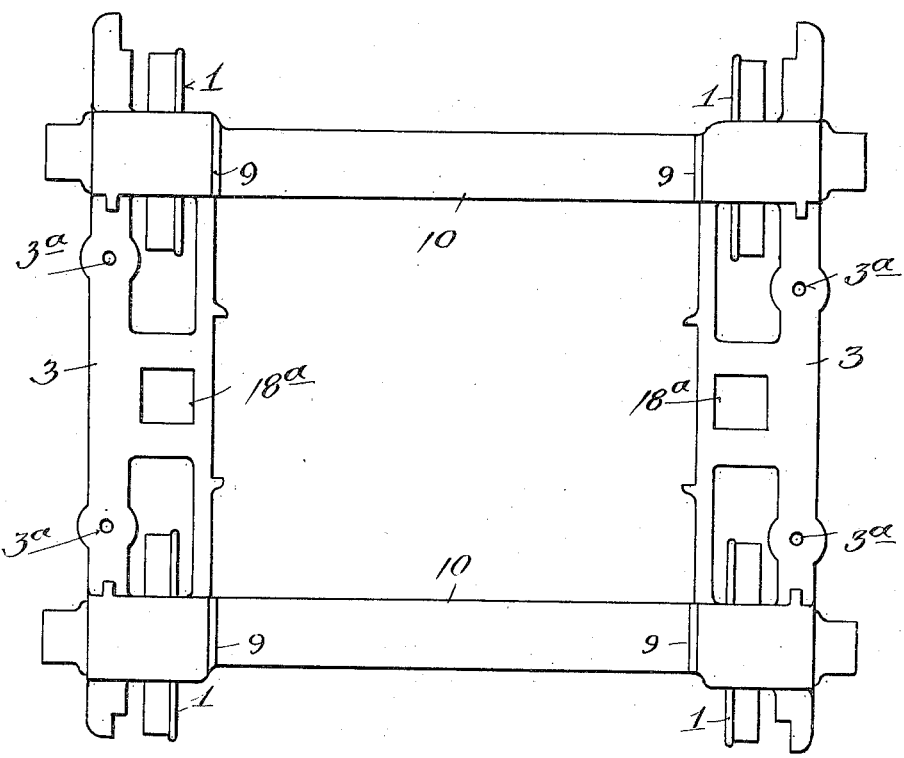
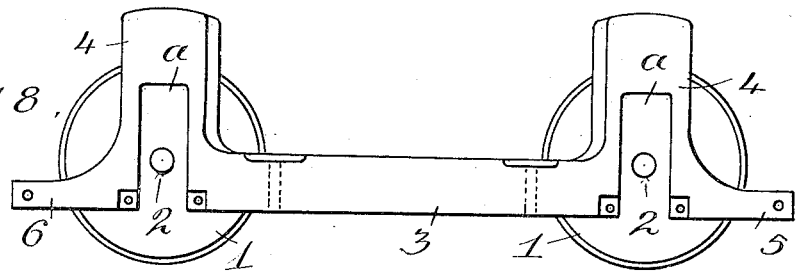
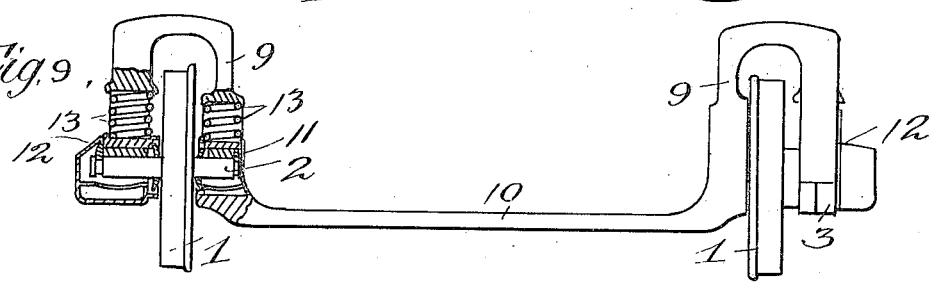
Witnesses:
Charles W. Benjamin, Inventor
By his Attorney
Samuel E. Darby

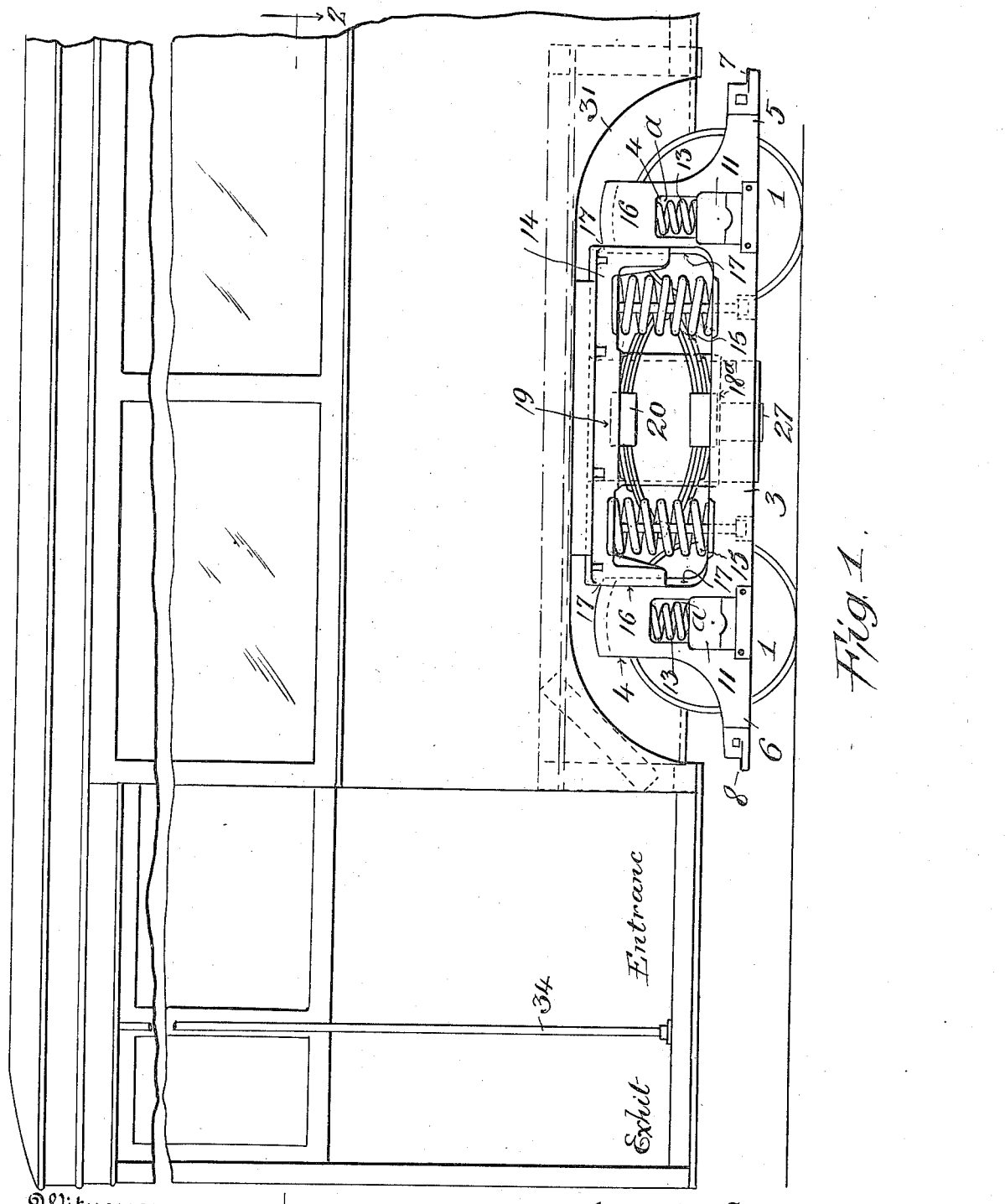

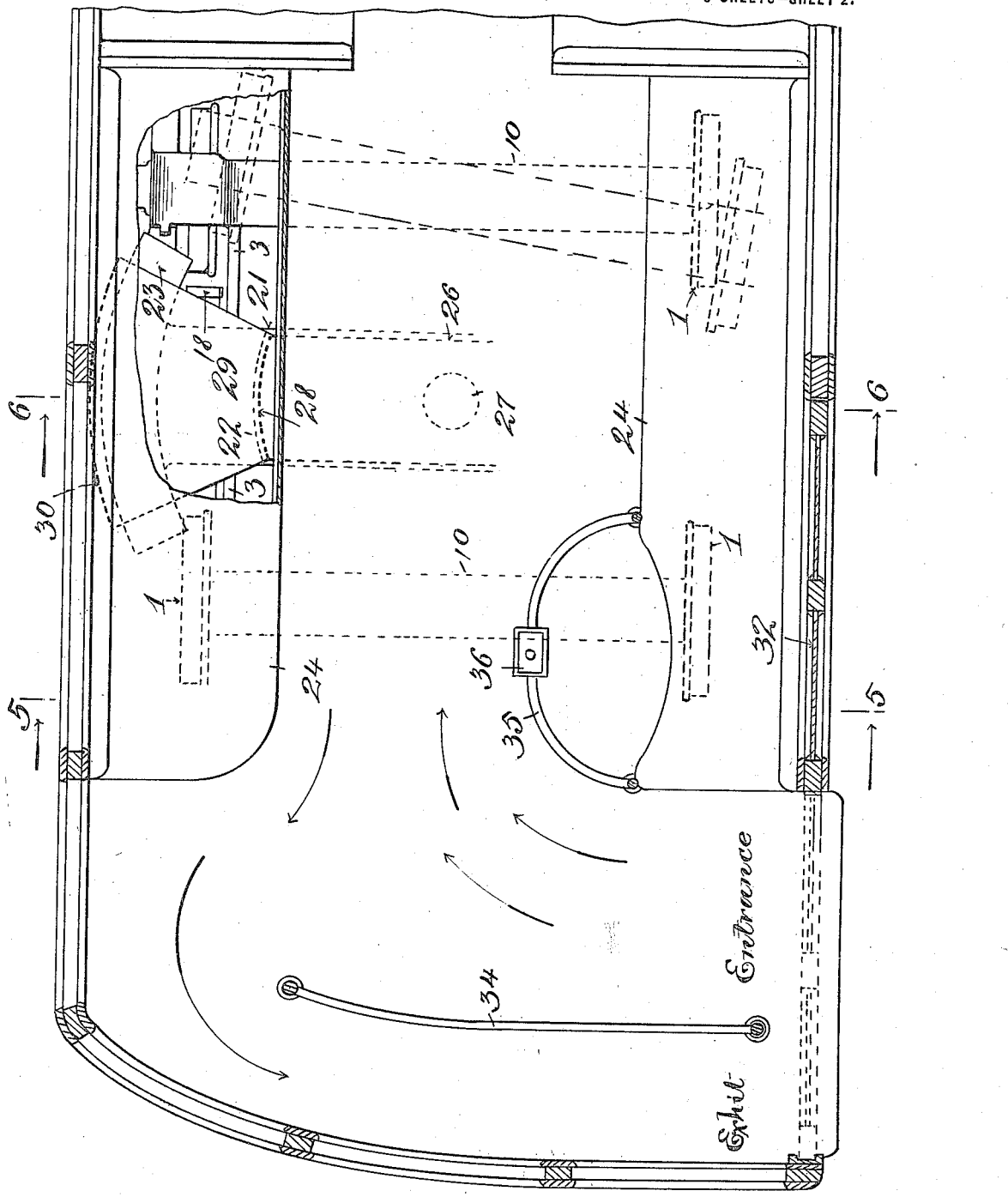

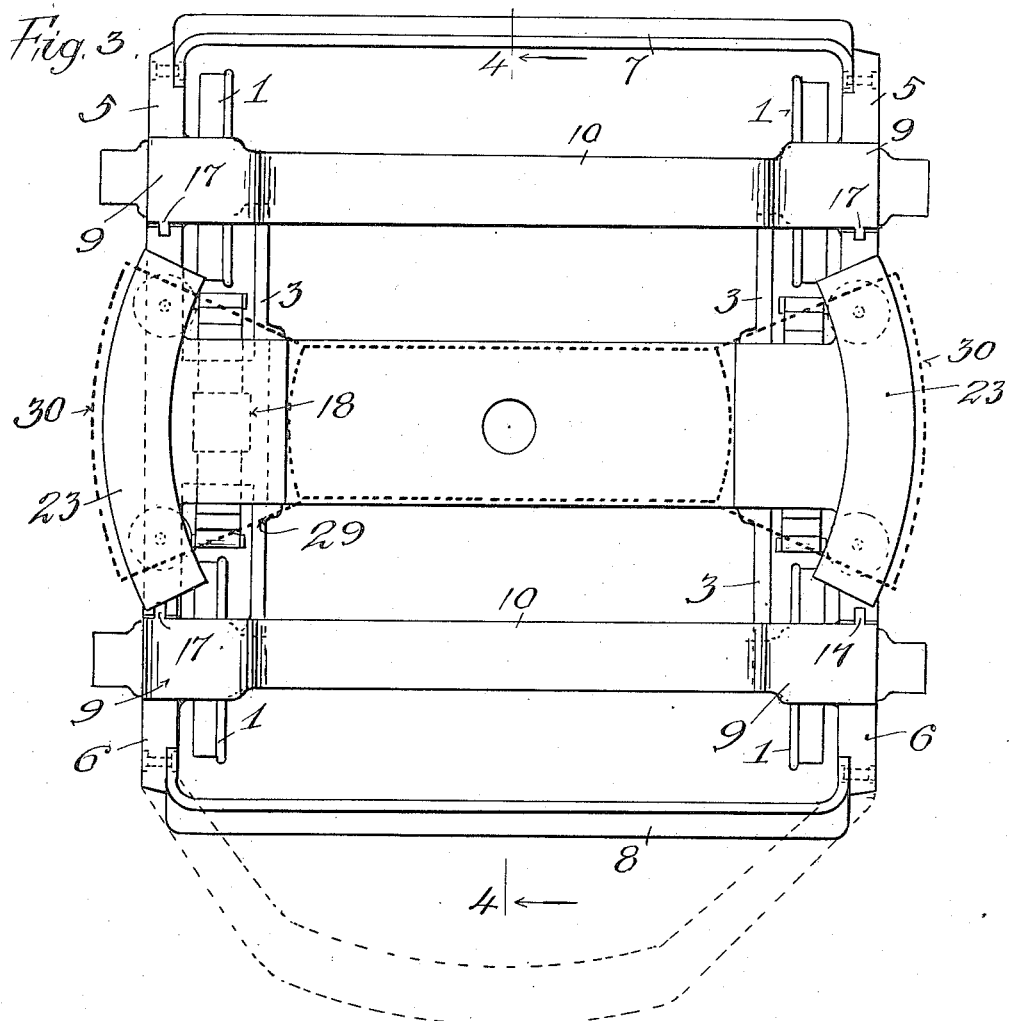

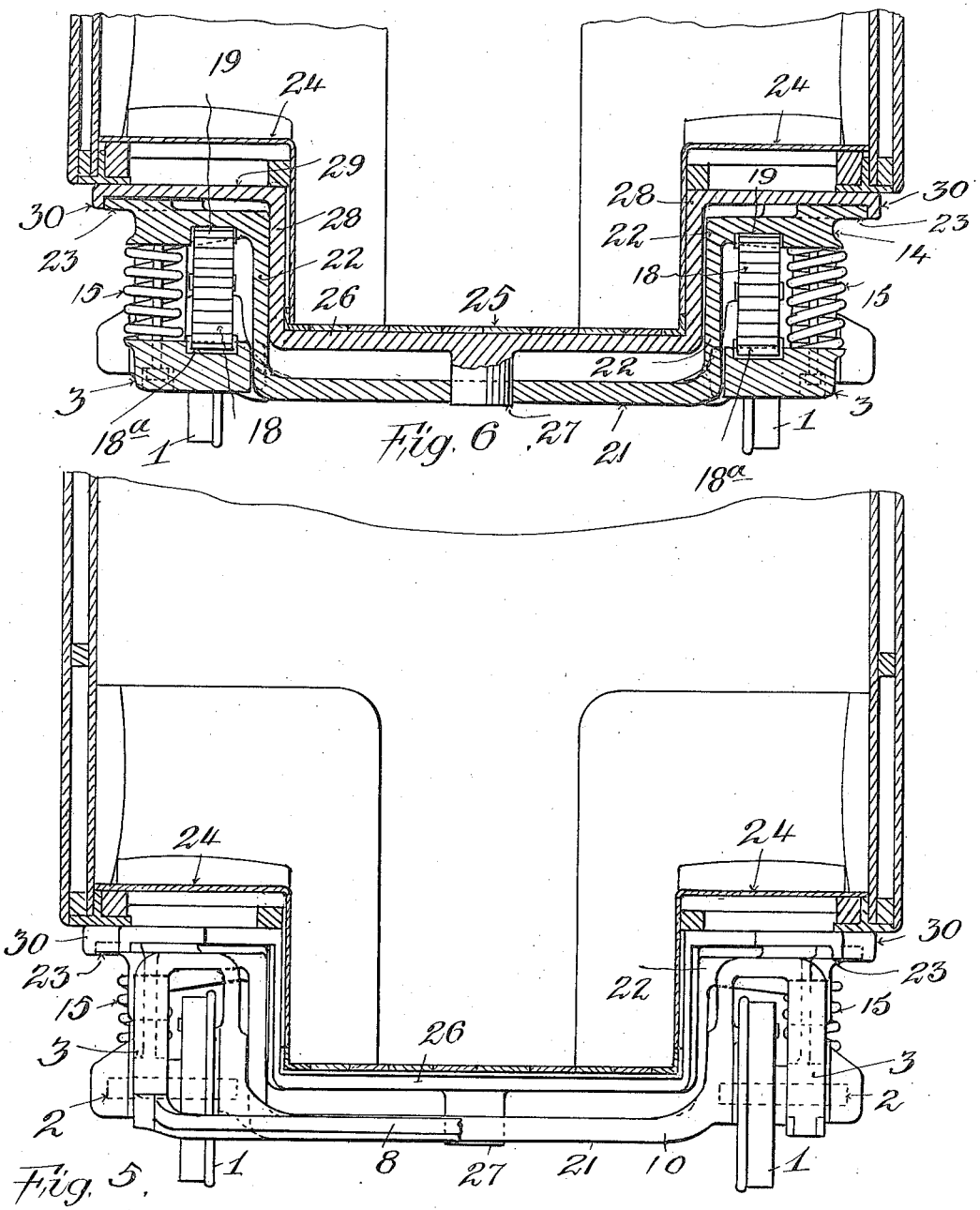

UNITED STATES PATENT OFFICE.

CHARLES W. BENJAMIN, OF CRANFORD, NEW JERSEY, ASSIGNOR TO PREPAYMENT CAR SALES COMPANY, OF CHICAGO, ILLINOIS, A CORPORATION OF WEST VIRGINIA.

STEPLESS CAR.

1,186,539.  Specification of Letters Patent.  Patented June 13, 1916.

Application filed April 4, 1913. Serial No. 758,747.

*To all whom it may concern:*

Be it known that I, CHARLES W. BENJAMIN, a citizen of the United States, residing at Cranford, county of Union, State of New Jersey, have made a certain new and useful Invention in Stepless Cars, of which the following is a specification.

This invention relates to stepless cars.

The object of the invention is to provide a stepless car that will reduce the floor level of the car not only along the seating space but also at the ends of the car.

Another object of the invention is to provide a car of the stepless type which will enable the entrance to and exit from the car to be located at the end of the car.

Other objects of the invention will appear more fully hereinafter.

The invention consists substantially in the combination, construction, location and relative arrangement of parts all as will be more fully hereinafter set forth as shown in the accompanying drawings and finally pointed out in the appended claims.

Referring to the accompanying drawings:—Figure 1 is a view in side elevation of one end of a car body structure, parts broken off showing an arrangement of stepless car embodying the principles of my invention. Fig. 2 is a top plan view of the same, parts broken out and parts in horizontal section on the line 2, 2, Fig. 1, showing the entrance and exit passages and relative arrangement of the car truck at the end of the car. Fig. 3 is a top plan view showing a construction of truck employed in carrying out my invention. Fig. 4 is a view in vertical section on the line 4, 4, Fig. 3, looking in the direction of the arrows. Fig. 5 is a broken view in vertical transverse section on the line 5, 5, Fig. 2, looking in the direction of the arrows. Fig. 6 is a view similar to Fig. 5 on the line 6, 6, Fig. 2, looking in the direction of the arrows. Fig. 7 is a view in top plan of the side and end portions of the truck frames. Fig. 8 is a view in side elevation of the same. Fig. 9 is a view in front elevation partly in transverse vertical section showing the axle box and springs.

In the present type of stepless street cars, the floor space is close to the level of the street at the center of the car and is inclined upwardly from the center entrance toward the ends of the car so as to provide space for the trucks. This necessitates the location of the entrance and exit doors or doorways at the center or near the center of the car in order that the advantage of the stepless feature may be attained.

In my present invention it is among my objects to reduce the height of the car floor level not only along the seating space and center of the car but also at the ends, in order that a stepless car may be provided with an end entrance and exit doorway.

In carrying out my invention in one form of embodiment thereof, I provide a truck consisting of four wheels 1, arranged in pairs, each wheel being mounted on a short axle 2. The axles 2 are only long enough to accommodate a wheel and to provide sufficient bearing in journal boxes located on each side of the wheel, that is, they do not extend across the truck as in previous constructions.

The truck frame is shown as constructed in two parts. One part consists of side bars 3 at each side of the truck. These side bars extend lengthwise the car between the wheels and are provided with integral axle box yokes 4, extending over the axles both inside and outside the wheels 1. The side frames 3, are extended at each end beyond the axle box yokes, as indicated at 5 and 6, and these extensions are connected together transversely of the truck by the usual cross bars 7 and 8. Connecting the side members 3 of the truck frame, are cross bars 10, extending transversely across the truck, below and parallel to the axles 2. These cross bars are yoked at their ends as shown at 9, and carry the axle boxes 11 and 12, in which the axles 2 are journaled. These boxes are located in the vertical openings as on the yokes 4. Spiral springs 13 are arranged over the axle boxes 11 and 12, and correspond to the usual axle box springs.

The other truck frame member, which is preferably formed in one piece, although it may be made in parts united together, consists of two equalizer bars 14, arranged over the side frames 3, and rests upon spiral springs 15, interposed between the side frames 3 and the equalizer bars 14, to carry the weight of the car body. The equalizer bars 14, have vertical grooves 16 in which are received and work in a sliding engagement, the flanges 17 on the inner edges of the axle yokes 4. Elliptic springs 18 are provided and are placed between the wheels on each side of the truck and between the side frames 3 and the equalizer bars 14. A socket 18ª, in each side frame 3 and a corresponding socket 19 in each equalizer bar 14, serve to receive and form seats for the clips of the elliptic springs. In addition to the equalizer bars 14, the second part of the truck frame includes as a part thereof, a truck bolster 21, which is arranged close to the ground and extends transversely across the truck and is supported or carried at its ends by the upwardly extending members 22 which lie close to the sides of the truck and which are integral with or secured to the equalizer bars 14. Each equalizer bar 14 is provided with a flanged rub plate 23, the outer edge of which is curved on an arc struck from the center of the truck.

The car body may be provided with any desired arrangement of seats, but preferably is formed with longitudinally extending seats 24 at each side of the car near its ends, and the floor 25 is depressed. To the under side of the car is secured a body bolster consisting of a horizontal cross member 26, which lies close to and parallel with the truck bolster 21, and it is provided with a pin 27 fitting in a recess in the member 21. This is in the nature of a king pin about which the swivel action of truck and body are secured. The body bolster is provided at its ends with upwardly extending portions 28, which lie parallel with the members 22, and said portions 28 are outwardly turned or extended to form rub plates, 29, which overhang and rest upon the truck rub plates 23.

The floor 25 of the car rests and is supported upon the car body bolster 26, which, as above explained extends transversely of the car and truck, and lies close to and parallel with the truck bolster 21, and having the vertical end portions 28 and the portions 29 which overhang and rest upon the truck plates 23. By this construction the car floor level is brought down to a single step distance from the ground at a point over the truck, and this low level of the car floor is maintained from the side doorway at the end of the car into the seating space of the car. By omitting the bulkhead between the seating space of the car and the boarding and alighting platform or landing of the car, ample space is provided between the longitudinal seats 24 at opposite sides of the car for passengers to pass freely between said seats.

Flanges 30 under the rub plates 29 engage the outside edges of the rub plates 23. The weight of the car body rests on the rub plates 29 and 23 and is carried by both the spiral springs 15 and the elliptical springs 18. The body bolster and truck bolster move together except for the swiveling movement of the truck bolster, relatively to the body bolster. The depressed floor construction is carried to the extreme end of the car so that a stepless and end entrance and exit may be provided. The upright members 28 of the body bolster and the upright members 22 of the truck bolster are also curved upon arcs struck from the center of the king pin 27.

The broad idea involved in my invention is to do away with the long axles at the ends of the car so as to permit the level of the floor to be lowered at the end of the car, and to carry this out the cross parts of the car body and truck bolsters are depressed intermediate their ends. In order to permit the trucks to turn in relation to the car body, the latter is provided with recesses 31 at each side.

The entrance and exit doorway may be controlled by a door, if desired, and any suitable, convenient or desired door structure may be employed. In the particular form shown, to which of course, my invention is not to be limited or restricted, a door of the sliding type is employed, as indicated at 32, and where a door is employed it may be controlled in any well known manner and from any desired point.

A stepless car such as above described attains all the advantages of a car having its floor level within a single step distance from the ground at the ends of the car instead of the center with ingress and egress openings for passengers to and from the car located at the ends of the car.

It is obvious that an end entrance and exit stepless car may be arranged for fare prepayment. An arrangement for this purpose is shown wherein a railing 34 may serve to divide the space inside the doorway into separate entrance and exit passages, while a railing 35, a fare box 36 or other convenient means may serve to define a fare prepayment and door control station on or adjacent the line of travel of entering passengers.

Having now set forth the objects and nature of my invention, I desire it to be understood that many variations in the details of construction and arrangement might readily occur to persons skilled in the art and still fall within the spirit and scope of my invention as defined in the claims. My invention, therefore, is not to be limited or restricted to the exact details shown and described. But What I do claim as new and useful and of my own invention and desire to secure by Letters Patent is:—

1. A car, a truck having side members, truck wheels independently journaled in said side members, a car body bolster having its ends upwardly and outwardly extended to overhang the truck side members and a floor for the car supported upon the car bolster intermediate the upwardly extending ends of the latter.

2. A car having a floor, a truck having side members, said side members provided with upwardly extending yokes at their ends, journal boxes mounted in said yokes, truck wheel stub axles journaled in said boxes, a car body bolster having upwardly and outwardly extending ends to overhang the truck side members, the car floor resting upon said bolster intermediate the upwardly extending end portions of the latter.

3. A car having a floor, a truck having side members, journal boxes arranged to work in openings in said side members, stub axles journaled in said boxes, truck wheels carried by said stub axles, a car body bolster having upwardly and outwardly extending end portions arranged to overhang the truck side members, said car floor supported upon said bolster intermediate its end portions.

4. A car having a floor, a truck having side members, cross bars connecting said side members, said cross bars having upwardly extending end portions arranged to overhang the truck side members, journal boxes carried by said end portions, truck wheel stub axles journaled in said boxes, a car body bolster also having upwardly extending end portions arranged to overhang the truck side members and forming a support, intermediate its end for the car floor.

5. A car having a floor, a supporting truck therefor, said car and truck having transversely extending members provided with upwardly extending end portions to overhang the sides of the truck, the floor of the car being carried by the car member intermediate the overhanging ends of the latter.

6. A car having a floor, a supporting truck therefor, said car and truck having transversely extending members provided with upwardly extending end portions to overhang the sides of the truck, truck wheels independently journaled in said truck members, the floor of the car being carried by the car member intermediate the overhanging ends of the latter.

7. A car having a floor, a supporting truck therefore, said car and truck, respectively, having transversely extending members, truck wheels independently journaled in the ends of the truck member, the end of the car member being upwardly and outwardly extended to overhang the truck sides, the car floor carried by said car member intermediate the ends of the latter.

8. A car having a floor, a supporting truck therefor, said truck having transversely extending members movable vertically at their ends upon the sides of the truck, truck wheels independently journaled in the ends of said members, a car body bolster having upwardly and outwardly extending ends to overhang the sides of the truck, said floor being carried by said bolster intermediate the ends of the latter.

9. A car having a floor, a supporting truck therefor, a truck bolster having upwardly and outwardly extending end portions arranged to overhang the sides of the truck, springs interposed between said overhanging ends of the truck bolster and truck sides, a car bolster having vertically and outwardly extending end portions resting upon the end portions of the truck bolster, the car floor being carried by the car bolster intermediate the end portions of the latter.

10. A car having a floor, a supporting truck therefor, a truck bolster having vertically and outwardly extending end portions arranged to overhang the sides of the truck, the outer edge of said end portions being curved, a car bolster having vertically and outwardly extending end portions resting upon the end portions of the truck bolster and having a curved flange to engage over the curved end edges of the truck bolster, said bolsters being swivelly connected together, the car floor being carried by the car bolster intermediate the end portions of the latter.

11. A car having a floor, a truck having side members, equalizers, yieldingly supported upon said side members, a truck bolster having vertically extended end portions connected to said equalizers, a car bolster, having swivel connection with said truck bolster, the ends of the car bolster being arranged to extend upwardly and outwardly over said equalizers and supported thereon, the car floor being carried by said car bolster intermediate the upwardly extending ends of the latter.

12. A car having a floor, a truck having side members said side members having vertically extending yokes at their ends, equalizers having vertically sliding connection at their ends with said yokes, springs interposed between said equalizers and side members, a car bolster swivelly connected with the equalizers, and having vertically and outwardly extending end portions to overhang and rest upon said equalizers, the car floor being carried by said car bolster intermediate the end portions of the latter.

13. A car having a floor, a truck having side members, equalizers yieldingly supported upon said side members, a car bolster having upwardly and outwardly extending end portions to overhang and rest upon said equalizers, the car floor being carried by the car bolster intermediate the end portions of the latter.

In testimony whereof I have hereunto set my hand in the presence of the subscribing witnesses, on this 27th day of March, A. D. 1913.

CHARLES W. BENJAMIN.

Witnesses:
G. A. McGRATH,
S. E. DARBY.